March 18, 1947. A. M. COHAN 2,417,677
DISPLAY CARD
Filed Oct. 11, 1945 2 Sheets-Sheet 1.

INVENTOR.
Albert M. Cohan
BY
Charles K. Woodin
Agent.

March 18, 1947. A. M. COHAN 2,417,677
DISPLAY CARD
Filed Oct. 11, 1945 2 Sheets-Sheet 2
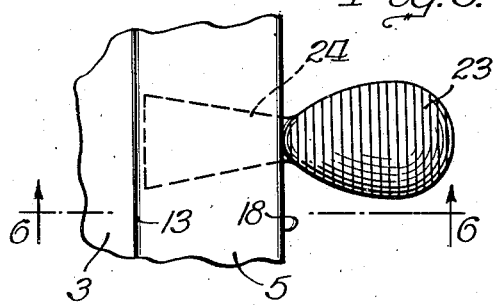
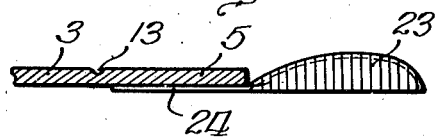
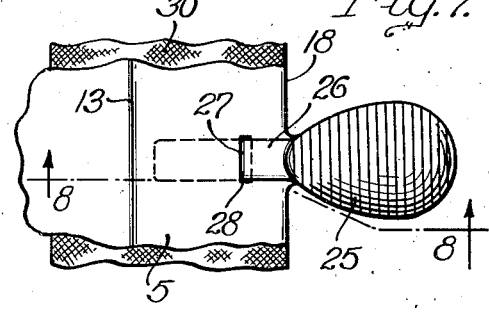
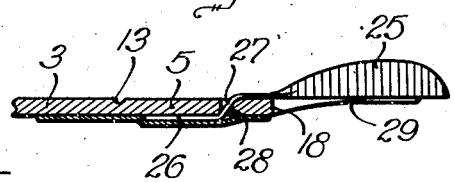
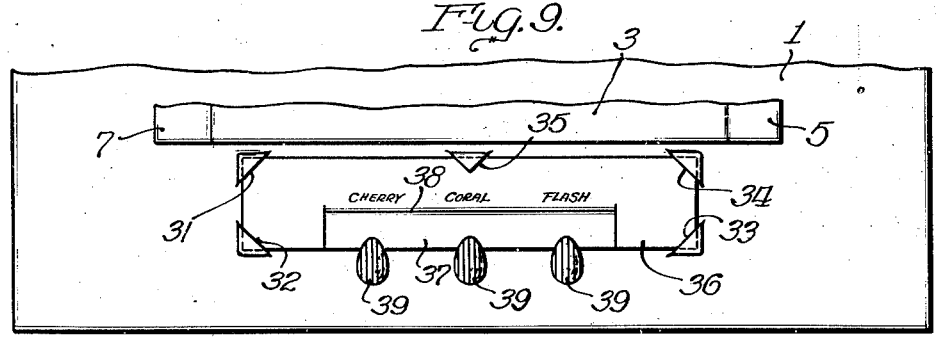
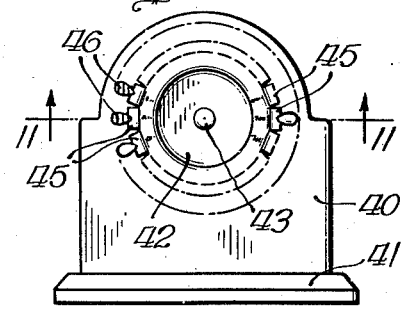
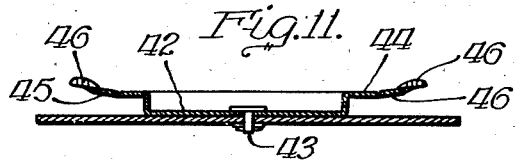
INVENTOR.
Albert M. Cohan
BY
Charles K. Woodin
Agent.

Patented Mar. 18, 1947

2,417,677

UNITED STATES PATENT OFFICE 2,417,677

DISPLAY CARD

Albert M. Cohan, Chicago, Ill.

Application October 11, 1945, Serial No. 621,706

11 Claims. (Cl. 35—59)

This invention is directed to a display means in the form of a card adapted for supporting a plurality of imitation fingernail chips which are colored to represent the various shades of fingernail polish sold by a dealer, such card and display unit comprising a convenient means for the use of a woman in making a selection of a particular fingernail shade.

One of the main objects of the present invention is to provide a card of the type described which provides additional means for supporting the colored fingernail chips for movement relative to the surface of the main supporting structure of the display means to permit a woman to insert her finger underneath one of the imitation fingernail chips causing the latter to simulate her own fingernail and thereby producing an accurate method of actually determining which shade of polish she feels is most desirable.

Another object of the present invention is to provide suitable novel mounting means which is adapted for suspending the fingernail chips substantially as individual imitation fingernails to provide a clear view of the entire finger to show the exact color relationship to the person making a color selection of fingernail polish when such person inserts a finger beneath a selected chip to create the proper illusion.

It is still a further object of the present invention to provide a display means adapted for carrying the fingernail chips in adjustable spaced relation with respect to the main backboard or supporting card and to provide a mounting means and supporting card wherein the surfaces thereof are both white to produce a specific contrasting background which will emphasize the true colors of the chips. Obviously, other card surface color combinations can be used to create what may be deemed to be an appropriate background for the purpose of making color selections of a particular shade of fingernail polish.

Other objects and advantages relating directly to the inherent features embodied in a display means of the present invention as shall hereinafter be referred to in the following detailed description have reference to the accompanying drawings representing a preferred disclosure of the invention.

In the drawings:

Fig. 5 is another fragmentary enlarged view of one of the fingernail chip portions of the mounting means, such view in this case being from the face side thereof in the manner in which the fingernail chip would be viewed in Fig. 1;

Fig. 6 is a cross sectional view of the construction illustrated in Fig. 5 as viewed along the line 6—6 therein; both Figures 5 and 6 representing a modified construction;

Fig. 7 is another enlarged fragmentary view similar to Fig. 5 illustrating still another modified mounting construction;

Fig. 8 is a cross sectional view of the modified construction in Fig. 7 as taken substantially along the line 8—8 therein;

Fig. 9 is a fragmentary portion of a display card illustrating a removable mounting feature for replacement purposes for presenting new color shades or additional ones as the case may be;

Fig. 10 is a face or front view of a modified display stand illustrating certain additional features that may be incorporated in carrying out the principles of the present invention; and Fig. 11 is a transverse cross sectional view of the modified form in Fig. 10 as taken substantially along the line 11—11 indicated therein.

Figure 1:
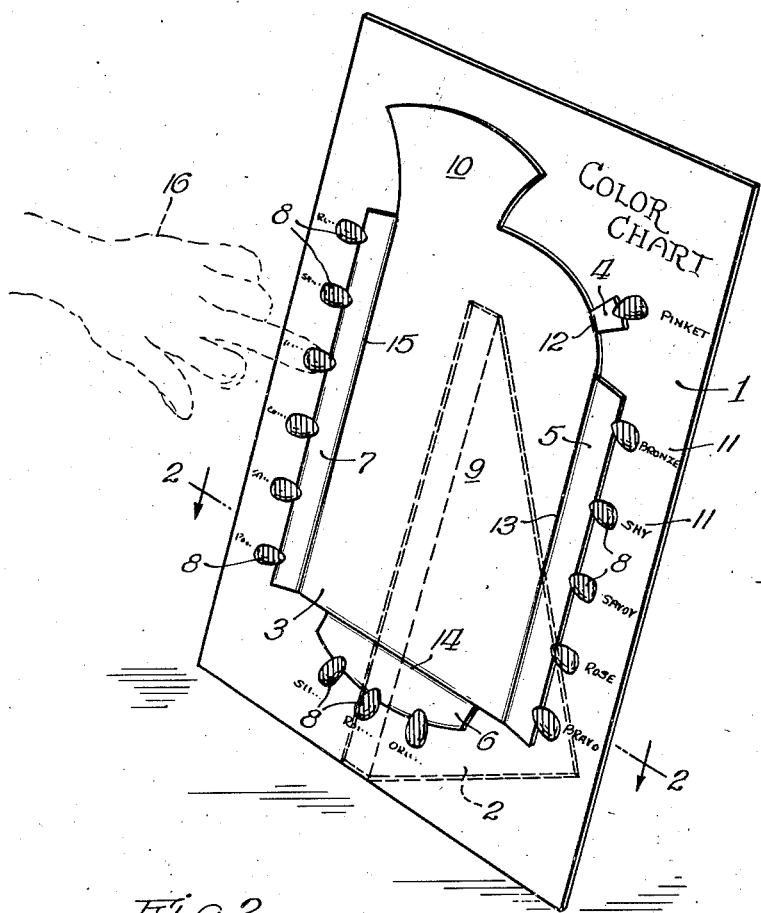
Fig. 1 is a perspective view indicating in general an easel type of display card designed for the purpose of making a proper selection of fingernail polish.

Referring now to Fig. 1, a preferred form of display means is here represented chiefly comprising a supporting card 1, having a foldable stand 2 for propping such card in an inclined position upon a flat surface in easel fashion, such card conveniently positioning the mounting means 3 to full view, which mounting means has a plurality of flaps 4, 5, 6 and 7 that carry fingernail chips 8. The entire display unit can be so shaped and arranged to provide certain advertising areas and, for example, in Fig. 1 the areas 9 and 10 of the mounting means 3 may be designated as such areas. The main purpose of advertising the product is obvious, but in this case such advertising is augmented by a convenient arrangement, simplifying with accuracy, the manner of making a color selection of a definite nail polish shade which the purchaser believes will best suit her.

To enhance the selection of a definite color shade of polish as represented by the individual chips 8, the edges of the card 1 adjacent such chips are preferably free of advertising aside from showing in small print 11 the names of the various shades of polish. Furthermore, card 1 and the adjacent portions of the mounting means 3 or the latter itself preferably provide white backgrounds to accentuate and establish a definite contrast to permit the user of the card to concentrate entirely upon the particular color shades under consideration.

Figure 2:
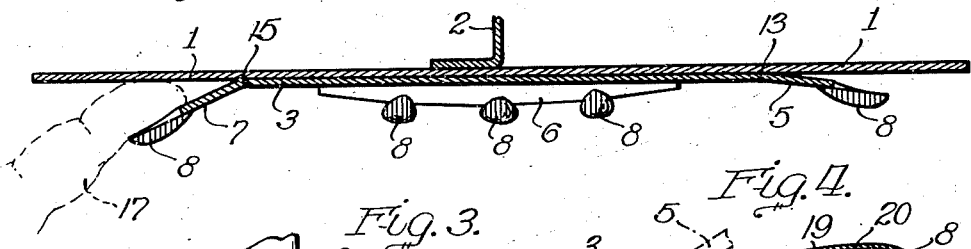
Fig. 2 is a transverse cross sectional view taken substantially along the line 2—2 in Fig. 1 emphasizing certain details of construction of the display card.

Referring now to Fig. 2, it is seen that the mounting means 3 is cemented or glued to the supporting card 1, and that the mounting means 3 is scored at 12, 13, 14 and 15 for the purpose of permitting the flaps 4, 5, 6 and 7 to move out of the general plane of the supporting card 1. This permits the swinging of the chips 8 into some angular position to allow a user to insert one of her fingers beneath the color chips as indicated at 16 in dotted lines in Fig. 1. A dotted finger 17 in Fig. 2 further indicates the manner in which this art is accomplished. Obviously, when a finger such as 17 is inserted beneath the chosen chip 8, the latter overlies the actual fingernail and presents a true view of the color of the chip 8 in substitute fashion producing an accurate indication as to whether or not the particular shade of the chosen chip is desirable. Although the mounting means 3 is shown and described as a separate card or element, it is also possible to die cut the chip holding flaps directly out of the supporting card 1.

Figure 3:
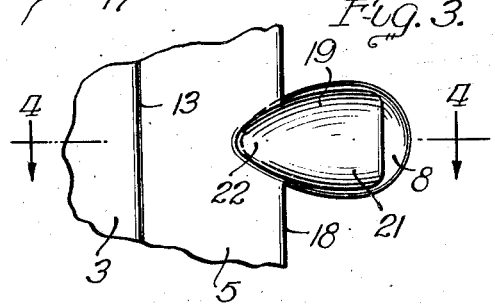
Fig. 3 is a fragmentary enlarged view of the mounting means as seen from underneath but separate and apart from the main supporting card.
Figure 4:
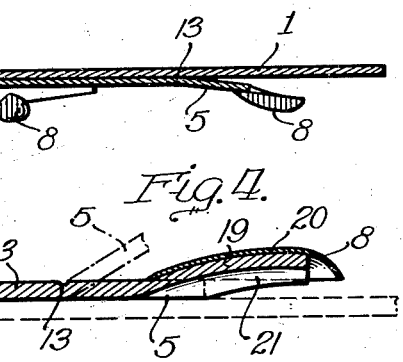
Fig. 4 is a cross sectional view of the structure illustrated in Fig. 3 as viewed along the line 4—4 in such figure.

To enhance the illusion created by inserting a finger beneath one of the chips 8, it is preferable and desirable to suspend the chips outwardly with respect to the edges of the holding flaps so as to make the chips substantially free without lateral or adjacent distracting supporting structure. For this reason, the chips 8 are suspended as better seen in Figs. 3 and 4 extending outwardly from the flap edges 18 with only the extreme tip portion having actual contact with the surface of the flap 5. To mount the chips 8 in this fashion, the edges 18 of the flaps such as 5 in Fig. 3 are provided with extension tabs 19 which project outwardly from such edges at 18. Such tabs are die formed and pressed or otherwise shaped with a concave outer surface 20 as shown in Fig. 4, and likewise with a concave under surface 21 immediately below the adjacent chip 8. The chips are cemented to the convex outer surface 20 in any suitable manner. Attention is directed to the fact that the concave under surface provides a means for positioning a finger of the user while making a comparison when the finger is inserted beneath one of the selected chips. The concavity of the tabs 19 extends inwardly beyond the edge 18 of the flap 5 and is shown in Fig. 3 at 22 to provide a reinforcing means which will resist bending of the tabs at or along the edges 18 of the mounting means. To further resist bending of the tabs along the edge lines of the flaps, each of the chips 8 is of concave construction and extends inwardly in superimposed relation to the portion 22 of the tab to provide a counter reinforcing cap means at the tab area. Thus, the chips are held in proper extended relation in the plane of the adjacent flaps and move directly therewith about the score line 13.

Referring now to Figs. 5 and 6, the construction herein represents a chip 23 formed with an elongation 24 as an integral part thereof. In this particular case the elongation 24 is cemented to the under side of the flap 5 and provides a means for supporting the chip 23 as a body entirely suspended beyond the outer edge 18 of the flap 5. It is preferable in this particular construction to only color the imitation nail portion represented by the chip 23 and to have the elongation 24 transparent and colorless, although very little of the latter is visible in the manner in which the mounting is constructed.

Figs. 7 and 8 show another arrangement of mounting wherein the chip is indicated at 25 also having an extension or elongation 26 as shown. In this case the elongation 26 is offset at 27 for insertion through suitable die cut openings or slits 28 provided in the flap 5 for the purpose of positioning the chip 25 and a portion of the elongation 26 directly in the surface plane of the flap 5. By carrying the elongation 26 through the opening 28 the same engages the bottom side of a portion of the flap as best shown in Fig. 8. Thus, the offset portions of the elongation 26 can be cemented respectively on top and beneath the flap 5, and in this case the edge 18 of the flap 5 may be provided with tabs 29 identical to tabs 21 indicated in Figs. 3 and 4. Such tabs 29 are cemented into the concave underside of the chips 25 and form an additional reinforcing element to rigidly hold the chips 25 entirely free and outwardly with respect to the edge 18 of the adjacent flap 5.

In the construction indicated in Figs. 7 and 8, it is also contemplated using a fabric tape 30, or the like, that can be secured to the underside or face of the mounting means 3 and over the extended flap portions to cover the ends of all of the plurality of elongations 26 of the chips 25. Furthermore, the tape 30 may be of such width as to extend across the hinged portion of the chip-holding mounting means as seen in Figs. 7 and 8 over the score 13 thereby reinforcing such hinged portion of the card counteracting rupturing or breakage of a flap at the score line thereof.

It might be desirable in a display means of this kind to make provisions for showing newly developed color shades of nail polish chips without necessitating a destruction or discarding of the entire display means. For this reason, Fig. 9 has been inserted to illustrate one manner in which a replaceable unit can be used to operate in the same manner as the chip mountings indicated in Fig. 1. In Fig. 9 the card 1 has been die cut and suitably embossed as indicated at 31, 32, 33, 34 and 35 to receive a card such as 36 which carries a plurality of chips representing newly-developed polish shades. Card 36 is provided with a flap 37 movable out of the general plane of the supporting structure and upon the score line 38 to move the chips 39 into spaced and angular relationship with respect to the main supporting card 1 for accommodating a finger beneath any chip 39 for the purpose of making color comparisons.

Figs. 10 and 11 represent a modified form of display stand incorporating the idea of having a revolving mounting means to conveniently bring any one of the color chips into a suitable position to the right or left of the median vertical center line of the stand so that a finger of either the right or left hand of the person using the same may be inserted beneath a selected color chip. This form of stand is provided with a main supporting card 40 mounted upon a convenient stand 41 with a cupped mounting means 42 rotatably connected at 43 with suitable pivotal means to the main card 40. Preferably such means 43 may be removable to provide interchangeable means to replace the mounting means with other mounting means presenting other color schemes for polish selections.

The mounting means 42 presents an annular ledge 44 upon which the shade identifying names may be printed opposite the chips. This mounting means has a plurality of flaps 45 radially disposed and movable out of the general plane of the ledge 44 through suitable scoring, each of such flaps 45 carrying one or more nail chips 46 directly thereon in the same manner as in the Fig. 1 construction. In this construction, the flaps 45 may be eliminated and the chips secured directly to the ledge 44.

The foregoing description is directed to certain forms of display devices shown as representative preferred constructions. It is to be understood, however, that changes and variations are contemplated and that this invention is not to be limited to the exact form, parts or combination of elements disclosed and described excepting as shall be governed by the appended claims defining the same.

What I claim is:

1. A display means for the selection of finger nail polish color shades comprising a card, flaps connected with said card and movable out of the general plane thereof, a plurality of chips connected with said flaps and tinted with available shades of polish, said flaps and said card together providing finger tip receiving space therebetween for superimposing any one of said tinted chips upon the fingernail of an inserted finger tip for making a shade selection.

2. A display means for the selection of finger nail polish color shade comprising a card, flaps connected with said card and movable out of the general plane thereof, a plurality of chips connected with said flaps and tinted with available shades of polish, said flaps and said card together providing finger tip receiving space therebetween for superimposing any one of said tinted chips upon the fingernail of an inserted finger tip for making a shade selection, and coacting means carried by certain of said flaps and the card respectively to provide means for bodily replacement of said certain flaps with like flaps having chips tinted with newly available color shades.

3. A display means for the selection of finger nail polish color shades comprising a card, flaps connected with said card and movable out of the general plane thereof, a plurality of chips connected with said flaps and tinted with available shades of polish, said flaps and said card together providing finger tip receiving space therebetween for superimposing any one of said tinted chips upon the fingernail of an inserted finger tip for making a shade selection, and means for rotating said flaps into predetermined positions for the convenience of the user thereof.

4. A display means for the selection of finger nail polish shades comprising a card, a plurality of nail polish color chips for said card, and positioning means carried by said card including a hinged flap connected with said chips to dispose the latter in spaced relation with respect to the surface of said card to allow fingertip insertion directly beneath any one of said polish color chips.

5. A display means for the selection of finger nail polish shades comprising a card, a plurality of nail polish color chips for said card, and supporting means carried by said card including a hinged flap connected with said chips to dispose the latter in spaced relation with respect to the surface of said card to allow fingertip insertion directly beneath any one of said polish color chips, said hinged flap and said chips each being concave at their points of connection to provide locating means to position a finger with its nail in proper relation beneath the selected color chip.

6. A display means for the selection of a color shade of fingernail polish comprising a supporting card, a plurality of nail polish color chips for each card, and mounting means carrying said chips in projecting relation along one edge thereof and having connection with said supporting card, said mounting means edge being arranged for movement relative to said supporting card to dispose said color chips in adjustable spaced relation with respect to said supporting card, said card and said mounting means together providing contrasting backgrounds to accentuate the color chips.

7. A display means for the selection of a color shade of fingernail polish comprising a supporting card, a plurality of nail polish color chips for said card, and mounting means carrying said chips in projecting relation along one edge thereof and having connection with said supporting card, said mounting means edge being arranged for movement relative to said supporting card to dispose said color chips in adjustable spaced relation with respect to said supporting card, said mounting means being provided with tab extensions to suspend each of said color chips in said projecting relation outwardly beyond the edge thereof to permit an unobstructed view of the finger with the substituted chip covering the nail when a fingertip is placed beneath a color chip to make a polish shade selection.

8. A display means for the selection of a color shade of fingernail polish comprising a supporting card, a plurality of nail polish color chips for said card, and mounting means carrying said chips in projecting relation along one edge thereof and having connection with said supporting card, said mounting means edge being arranged for movement relative to said supporting card to dispose said color chips in adjustable spaced relation with respect to said supporting card, said mounting means being provided with tab extensions to suspend each of said color chips in said projecting relation outwardly beyond the edge thereof to permit an unobstructed view of the finger with the substituted chip covering the nail when a fingertip is placed beneath a color chip to make a polish shade selection, said tabs and said color chips each being concave inwardly and outwardly with respect to the edge of said mounting means to reinforce the card edge at said tabs and to provide a fingernail locating recess.

9. A display means for the selection of a color shade of fingernail polish comprising a supporting card, a plurality of nail polish color chips for each card, and mounting means carrying said chips along one edge thereof and having connection with said supporting card, said mounting means edge being arranged for movement relative to said supporting card to dispose said color chips in adjustable spaced relation with respect to said supporting card, said color chips each having elongations thereon for connection with said edge of the mounting means, said elongations providing means to dispose said chips entirely beyond the mounting means edge for an unobstructed view of a finger having its nail placed beneath a selected chip for shade comparisons.

10. A display means for the selection of a color shade of fingernail polish comprising a supporting card, a plurality of nail polish color chips for said card, and mounting means carrying said chips along one edge thereof and having connection with said supporting card, said mounting means edge being arranged for movement relative to said supporting card to dispose said color chips in adjustable spaced relation with respect to said supporting card, said mounting means edge having tab extensions, and said chips having elongations thereon, said tabs being adapted to suspend said color chips outwardly from the aforesaid edge, and said chip elongations being adapted to traverse said edge for connection with said mounting means, the tabs and chip elongations together providing rigid coacting means to hold the chips in predetermined relation with respect to said mounting means and in selected positions with respect to said card.

11. A display means for the selection of a color shade of fingernail polish comprising a supporting card, a plurality of nail polish color chips for said card, and mounting means carrying said chips along one edge thereof and having connection with said supporting card, said mounting means being scored to permit said chip edge to move relatively to said card into adjusted positions, and said color chips each having elongations thereon for connection with said edge and to suspend said chips outwardly with respect to said edge, and a securing tape for rigidly fastening said chip elongations to the movable edge of said mounting means, said tape being adapted to overlay said mounting means score to counteract rupture at the score line from continued flexing in moving said chip carrying edge away from or toward the supporting card.

ALBERT M. COHAN.

REFERENCES CITED

The following references are of record in the file of this patent:

UNITED STATES PATENTS

| Number | Name | Date |
|---|---|---|
| 281,657 | Bowman | July 17, 1883 |
| 2,020,100 | Boyd | Nov. 5, 1935 |
| 1,865,377 | Lewis | June 28, 1932 |
| 1,990,630 | Bensel | Feb. 12, 1935 |
| 2,017,538 | Kasparin | Oct. 15, 1935 |
| 2,195,495 | Popp | Apr. 2, 1940 |
| 1,709,066 | Field | Apr. 16, 1929 |